(No Model.) 5 Sheets—Sheet 1.

S. A. GAGÉ.
MACHINE FOR MAKING SANDWICHES.

No. 546,662. Patented Sept. 24, 1895.

Witnesses:
Lewis B. Wynne.
Daniel W. Love.

Inventor:
Severin A. Gagé
By Briesen & Knauth
his attorneys (No Model.) 5 Sheets—Sheet 2.

S. A. GAGE.
MACHINE FOR MAKING SANDWICHES.

No. 546,662. Patented Sept. 24, 1895.

Witnesses:
Lewis B. Wynne.
Daniel W. Lord

Inventor
Severin A. Gagé
By Briesen & Knauth
his Attorneys

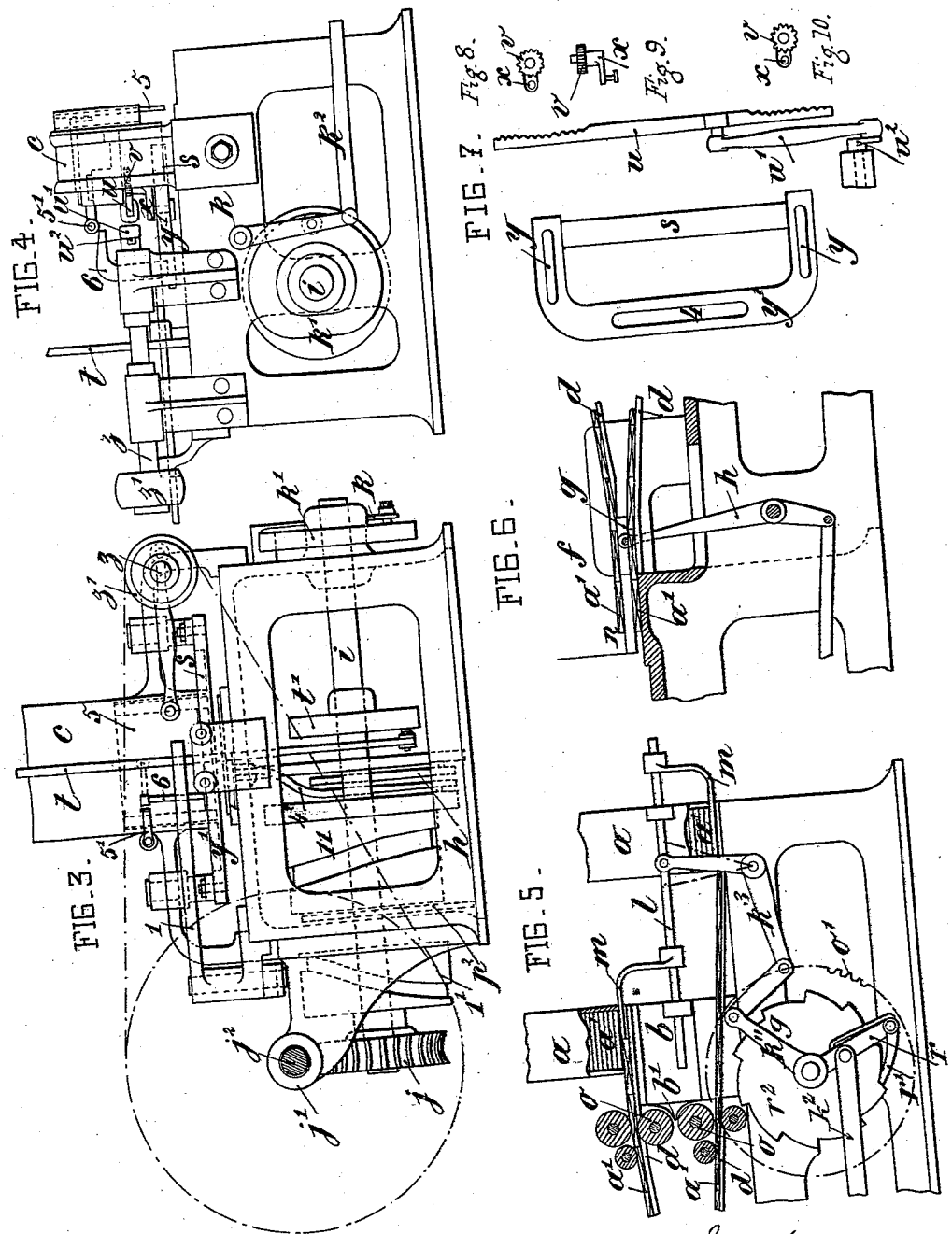

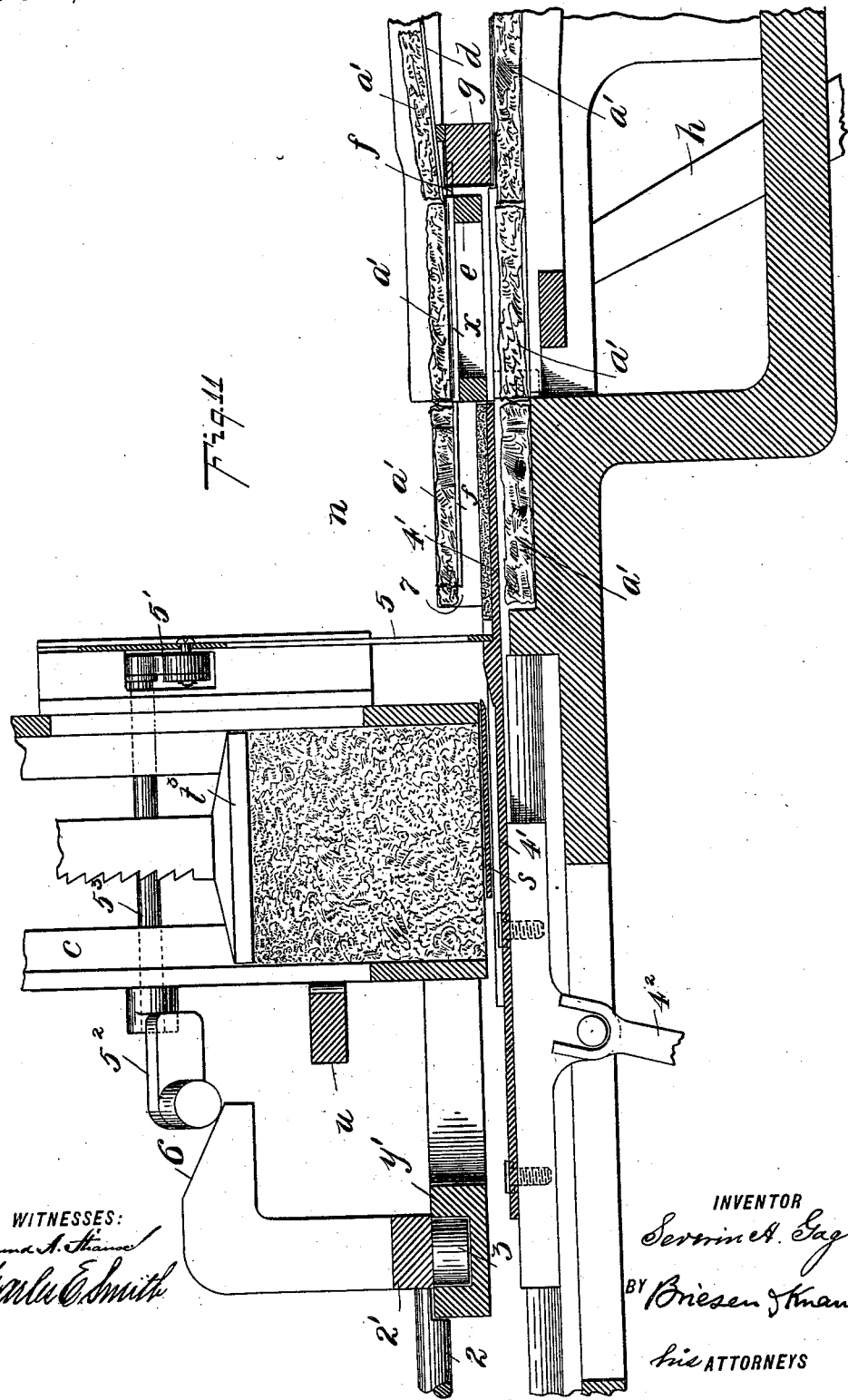
(No Model.) 5 Sheets—Sheet 4.
S. A. GAGE.
MACHINE FOR MAKING SANDWICHES.
No. 546,662. Patented Sept. 24, 1895.

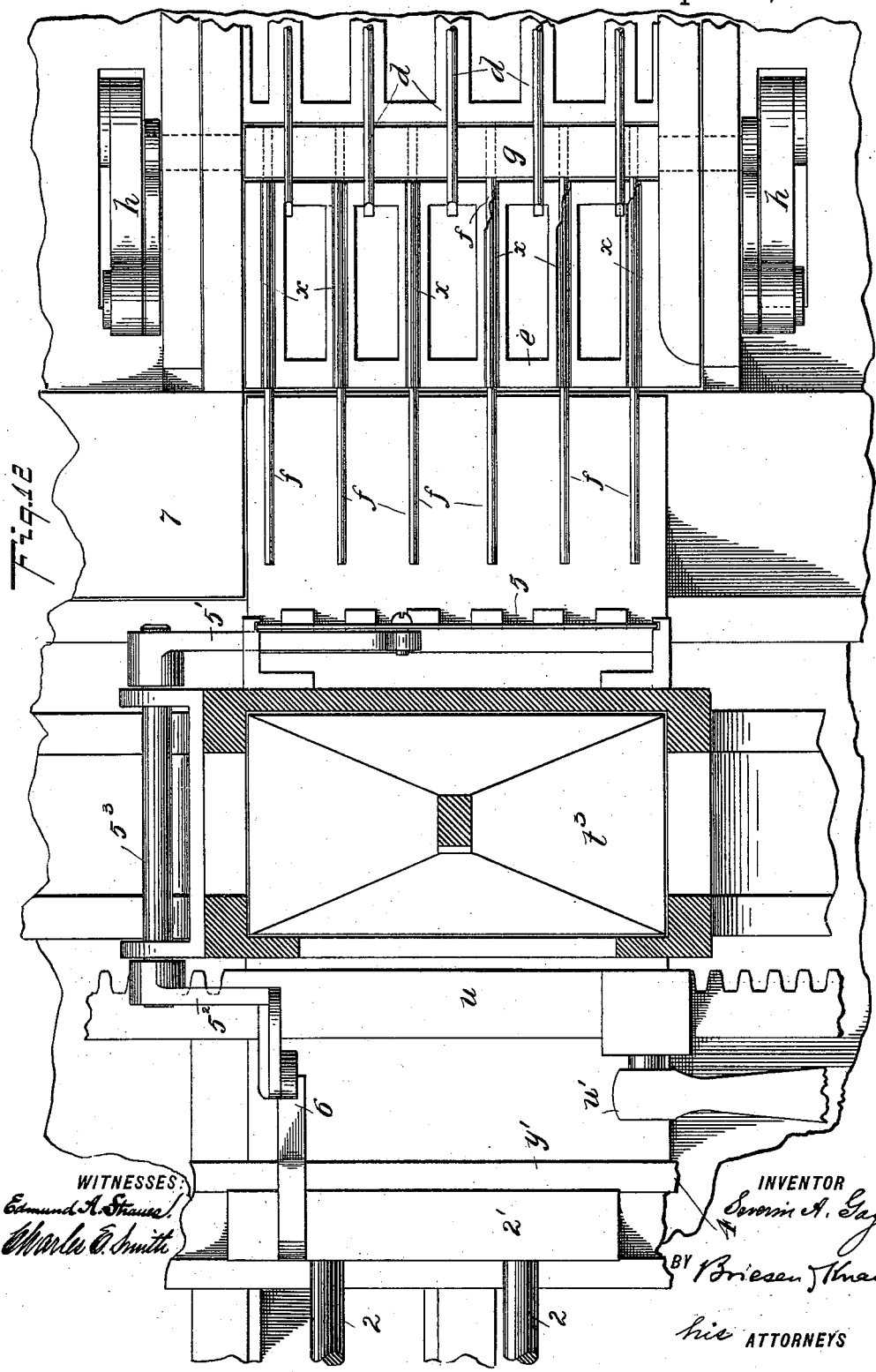

UNITED STATES PATENT OFFICE.

SEVERIN AUGUSTE GAGÉ, OF PARIS, FRANCE.

MACHINE FOR MAKING SANDWICHES.

SPECIFICATION forming part of Letters Patent No. 546,662, dated September 24, 1895.

Application filed March 30, 1892. Serial No. 427,016. (No model.) Patented in France August 10, 1891, No. 215,429.

*To all whom it may concern:*

Be it known that I, SEVERIN AUGUSTE GAGÉ, of the city of Paris, France, have invented a Machine for Making Sandwiches, (for which I have obtained Letters Patent in France for fifteen years, dated August 10, 1891, No. 215,429,) of which the following is a full, clear, and exact description.

This invention relates to a machine for making sandwiches, and will be described with reference to the accompanying drawings, forming part of this specification, wherein—

Figure 1:
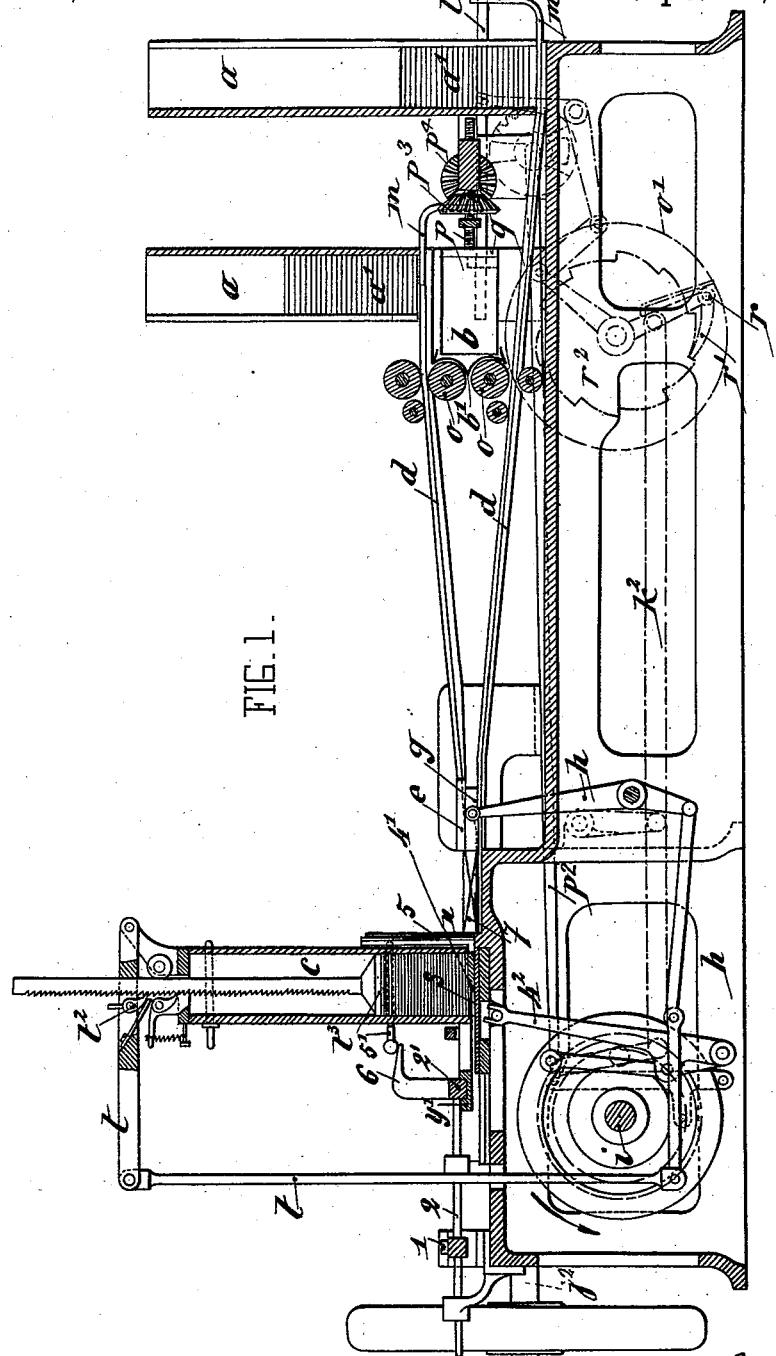
Figure 2:
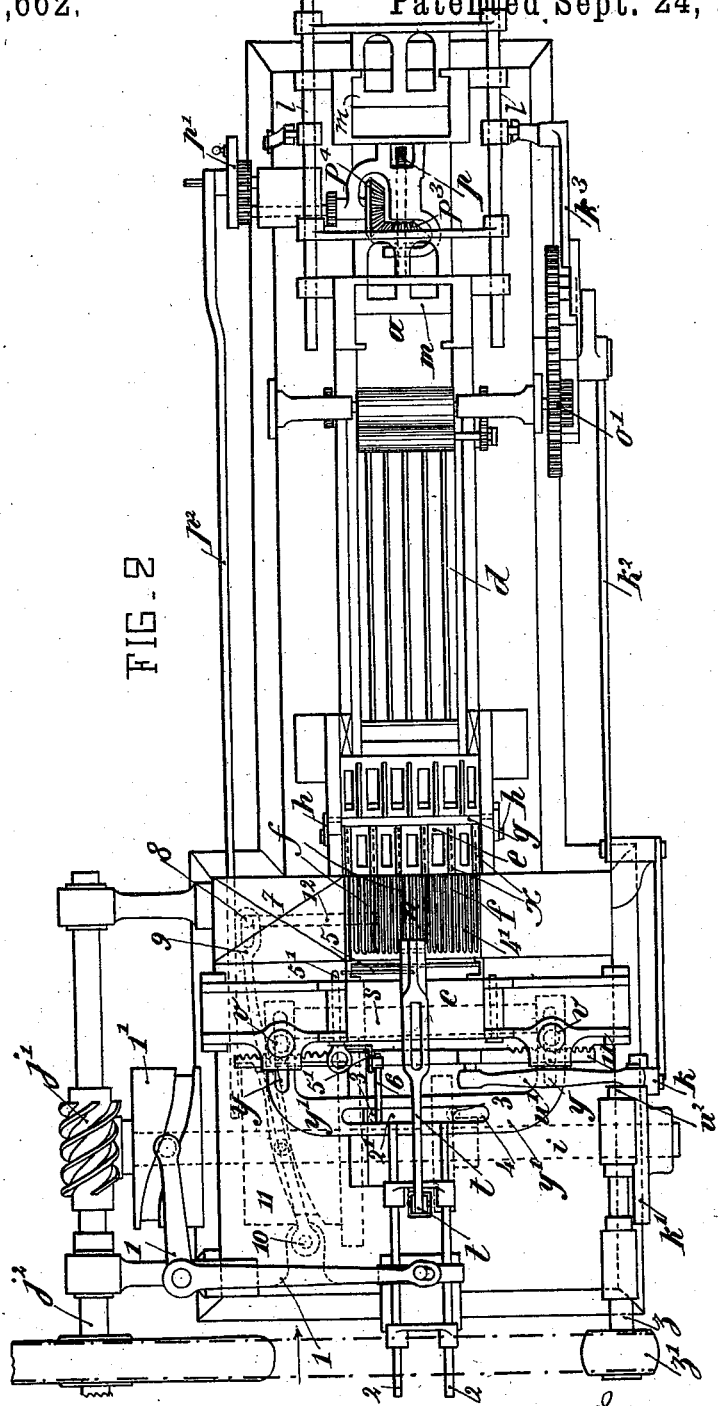

Figure 1 represents a longitudinal section; Fig. 2, a plan of the machine. Fig. 3 is an end elevation, looking in the direction of the arrow in Fig. 2. Fig. 4 is a detail side elevation of a portion of the machine, as will be hereinafter more fully described. Figs. 5 and 6 are vertical longitudinal detail views, partly in section, of the bread feeding and buttering mechanism. Figs. 7, 8, 9, and 10 are detail views of a portion of the meat-cutting mechanism. Fig. 11 is a vertical longitudinal sectional view of a portion of my improved sandwich-making machine. Fig. 12 is a top view of the same.

The same letters and numerals of reference indicate the same parts in all the figures.

My invention consists in the arrangement and combination of parts in a sandwich-making machine, as is hereinafter described and claimed.

The machine comprises two containers or hoppers $a\ a$ for the bread $a'$, a butter-container $b$, and a meat-container $c$, all made of the form and dimensions required for the kind of sandwiches to be made. The containers $a$ are filled with superposed slices of bread $a'$, and from each of them extends a guideway $d$ toward the meat-container $c$, the upper one of these guideways leading to a grid-frame or supplemental guide $e$, in the hollow tubes $x$ of which slide a series of wires $f$, carried on a cross-head $g$, receiving a reciprocating motion from levers $h$. The wires in themselves form a movable grid, which when in its forward position extends beyond the grid-frame $e$ a considerable distance and supports the slice of bread $a'$ when the same is pushed forward by the succeeding slices from the upper container $a$ in order to allow a slice of meat to be inserted between it and the underneath slice of bread $a'$. At the proper moment the grid is withdrawn within the grid-frame and the upper slice of bread will be deposited upon the meat which has been deposited upon the lower slice, as will be hereinafter described. The cams by which the several movements are imparted to the different parts are all keyed on the main shaft $i$, which receives motion from a worm-wheel $j$ and worm $j'$.

A lever $k$, operated by one of the cams $k'$, Fig. 4, actuates, through connecting-rod $k^2$ and a series of pivoted levers $r$ and $k^3$, two parallel slide-rods $l$, to which are connected plungers $m$, Fig. 5, working beneath the hoppers $a\ a$ and adapted to remove at each forward stroke the lowermost slices of bread $a'$ from the piles contained in the said hoppers and advance the slices a distance equal to their own breadth or length along the guideways $d$, by which they are conducted to the point $n$, Figs. 1 and 11, at which the sandwiches are made. On the plungers $m$ receding they allow the pile of slices $a'$ to descend by gravity in the cases $a$ in readiness for the next stroke, a train of slices being thus fed forward on each guideway $d$. The slices of bread in passing between the pairs of rollers $o$ are slightly pressed by them and receive therefrom a layer of butter, with which the rollers are charged by the container $b$, the rollers being for this purpose grooved both longitudinally and circumferentially.

The rollers have the same surface speed as the rate of advance of the slices which they assist to advance. Simultaneously with the movement of the rollers the screw $p$ advances a plunger $q$, Fig. 1, whereby the butter is expressed through two narrow slits $b'$, made in container $b$, upon the grooved surfaces thereof. Motion is imparted to the screw $p$ in the following manner: Upon the screw $p$ is secured a bevel-gear $p^3$, meshing into another bevel-gear $p^4$, secured to a shaft extending at right angles to the screw $p$, as shown in Fig. 2, and provided on its outer end with a ratchet-wheel, in which works a pawl $p'$. This pawl receives a reciprocating movement through a rod $p^2$, which is itself reciprocated through its connection with a cam-groove in the side of the cam-wheel 11 on the shaft $i$, as shown in Figs. 1 and 2. Instead of regulating the rate of feed by the ratchet-and-pawl movement the slits may be made variable in width in order to vary the thickness of the layer of butter, or when mustard, anchovy paste, or other preparations are to be applied. The rollers $o$ are provided with a train of gear-wheels, to one of which $o'$ is secured a ratchet-wheel $r^2$, as shown in Fig. 5. This ratchet-wheel is operated by a pawl $r'$ on the outer end of a lever $r$, pivoted on the shaft carrying the ratchet-wheel, the lever $r$ being connected with and operated by the reciprocating lever $k^2$, which actuates the plungers $m$.

A knife $s$ receives a constant rapid reciprocating motion in the transverse direction of the machine, and is also caused to advance beneath the bottom of the meat-container $c$, so as to give a shearing action to the knife to cut a slice of meat, the thickness of which is regulated by the rate of feed of the meat, determined by the stroke of a lever $t$, operated by a cam $t'$, Fig. 3, on a shaft $i$, acting through a pawl $t^2$ upon the vertical rack-rod of a plunger $t^3$, pressing on the meat in the container $c$, as shown in Fig. 1.

The mechanism whereby the knife $s$ receives two independent motions, as above referred to, is shown in Figs. 1, 2, 3, and 4, and comprises a rack-bar $u$, (Figs. 2 and 7,) gearing with pinions $v$ $v$, carried by cranks $x$ $x$, whose pins engage in slots $y$ in the ends of the frame $y'$, which carries the knife $s$. The rack-bar $u$ receives the reciprocating motion, through a connecting-rod $u'$, from a crank $u^2$ on the shaft $z$, on the end of which is supported a pulley $z'$, receiving motion, through a belt, from a shaft $j^2$.

A horizontally-disposed bell-crank lever 1 receives motion from a cam $1'$ on a shaft $i$ for the purpose of pressing the knife-frame $y'$ forward in a direction at right angles to its reciprocating motion—that is to say, in the longitudinal direction of the machine—the two movements being simultaneous, the lever 1 being connected to a pair of slide-rods 2, (see Figs. 2, 11, and 12,) fixed to a cross-head $2'$, carrying antifriction-rollers 3, working in a slot 4 in the knife-frame $y'$, permitting of the reciprocating movement of said frame. The slice of meat thus cut off is received on a small longitudinally-reciprocating carrier-plate $4'$, by which it is placed, by means of a connecting-rod $4^2$, between the buttered slices of bread, whereupon the carrier-plate $4'$ is withdrawn at the same time as the grid $f$, carrying the upper slice of bread, so as to allow the meat to drop on the lower slice and be then covered by the upper slice, thus forming the sandwich. To prevent the meat from adhering to the carrier $4'$, Figs. 11 and 12, on its backward movement, a small vertically-movable metallic curtain 5, raised by a series of levers $5'$ $5^2$ on the rock-shaft $5^3$ and a cam 6, carried by the knife-frame $y'$, is caused to drop onto the carrier-plate, and so prevent the meat from being drawn back with the carrier. The sandwich is finally delivered at one side of the machine by a device or tray 7, which bears underneath a trunnion 8, connected to a lever 9, which latter is pivoted at the point 10 and receives a reciprocating motion transverse to the machine. Said device or tray 7 is actuated by a cam on the cam-wheel 11, fixed on a shaft $i$, as shown in Fig. 2. The trunnion 8 slides in an aperture 12 made in the frame of the machine. The sandwich, if desired, may be slightly compressed between two rollers and automatically deposited in a box.

For the purpose of clearness I have referred throughout the specification to the bread-hoppers, meat-hoppers, butter-spreading-rolls hopper, &c., they being the substances most generally employed in making sandwiches; but it it obvious that any other suitable substances might be employed in such hoppers, spreading-rolls, &c. I have also described with some particularity the various details of the sandwich-making machine shown, but would have it understood that such machine illustrates but one form of my invention and that many changes might be made therein without departing from the spirit of my invention.

What I claim, and desire to secure by Letters Patent, is—

1. In a machine for making sandwiches, the combination of bread hoppers, a meat container, butter spreading devices adapted to butter the bread received from said bread hoppers and a carrier for conveying the meat from said meat container and interposing it between the slices of bread, substantially as described.

2. In a machine for making sandwiches, the combination of bread hoppers, a meat container, a suitably operated carrier plate therefor, feeding devices for advancing the bread from said bread hoppers to the meat container and butter feeding rolls interposed between said bread hoppers and meat container, substantially as described.

3. In a machine for making sandwiches, the combination of bread hoppers, a meat container, a suitably operated knife therefor, a carrier plate to receive the meat from said knife and feeding devices for advancing the bread from said bread hoppers to each side of the carrier plate, substantially as described.

4. In a machine for making sandwiches, the combination of bread hoppers, a meat container, a suitably operated carrier plate and knife therefor, feeding devices for advancing the bread from said bread hoppers to the meat container, and butter feeding rolls interposed between said bread hoppers and meat container, substantially as described.

5. In a machine for making sandwiches, the combination of bread containing hoppers, suitably operated plungers therefor, guideways communicating therewith, a grid-frame connected with said guide-ways, a suitably operated grid, and means for automatically placing meat between the slices all arranged and operated substantially as and for the purposes set forth.

6. In a machine for making sandwiches, the combination of butter rollers, means for automatically and intermittently feeding slices of bread to opposite sides thereof, a butter feeder or container for said butter rollers, a plunger for said butter container, a screw for said plunger, means connected with the screw for automatically and intermittently advancing the plunger as the slices of bread are fed to the butter rollers, whereby a plurality of slices are fed simultaneously to the butter rollers and buttered on their opposing faces, substantially as described.

7. In a machine for making sandwiches, the combination of a meat container, a knife operating therein, means for operating said knife, a suitably operated carrier plate for discharging the cut meat and a curtain adapted to come into the path of said carrier plate in its backward movement, substantially as described.

8. In a machine for making sandwiches, the combination of pushers $m$, suitably operated rods $l$ connected therewith, grid-frame $e$, guideways $d$ extending from said bread containing cases to the grid-frame $e$, grid-wires $f$, cross-head $g$ therefor, levers $h$ for operating said cross-head, and means for operating said lever $h$, all adapted to operate substantially as described and for the purposes set forth.

9. In a machine for making sandwiches, the combination with a meat container $c$, of guide-ways $d$, knife $s$, lever $t$, rack-rod $q$, pinions $v$, cranks $x$, knife-carrier-frame $y'$, shafts $z$ and $i$, lever 1, curtain 5 and cam 6, all arranged substantially as and for the purposes specified.

10. The herein described machine for making sandwiches combining therein a bread feeding and buttering mechanism, mechanism for interposing a substance between the slices of bread consisting of a container $c$, knife $s$, operating therein, a carrier $4'$, and means for operating said knife and carrier, and a receiving tray 7 adapted to receive and discharge a completed sandwich, substantially as described.

The foregoing specification of my machine for making sandwiches signed by me this 10th day of March, 1892.

SEVERIN AUGUSTE GAGÉ.

Witnesses:
  ROBT. M. HOOPER,
  ALBERT MOREAU.